United States Patent [19]

Wood, Jr.

[11] Patent Number: 4,887,486

[45] Date of Patent: Dec. 19, 1989

[54] LINKAGE COMPONENT

[75] Inventor: Ruey E. Wood, Jr., St. Clair Shores, Mich.

[73] Assignee: TRW, Inc., Lyndhurst, Ohio

[21] Appl. No.: 158,927

[22] Filed: Feb. 22, 1988

[51] Int. Cl.⁴ ............................................. G05G 1/00
[52] U.S. Cl. .................................. 74/588; 74/579 R; 403/141
[58] Field of Search ...................... 74/588, 579 R, 586, 74/587; 403/56, 377, 139, 43, 141, 122, 132, 140, 77; 29/156.5 A; 280/95 R

[56] References Cited

U.S. PATENT DOCUMENTS

| | | | |
|---|---|---|---|
| 1,260,557 | 3/1918 | Layman . | |
| 1,418,083 | 5/1922 | Layman | 74/588 |
| 1,814,999 | 7/1931 | Benjamin | 74/579 X |
| 1,829,305 | 10/1931 | Sneed . | |
| 1,879,814 | 9/1932 | Morgan et al. | 29/156.5 A |
| 1,898,100 | 2/1933 | Skillman | 403/56 X |
| 1,909,100 | 5/1933 | Geyer | 74/579 |
| 1,929,807 | 10/1933 | Casper | 74/588 |
| 1,977,450 | 10/1934 | Mitchell | 74/588 X |
| 2,122,652 | 7/1938 | Lautz et al. | 403/56 X |
| 2,420,621 | 5/1947 | Ricks | 403/56 |
| 4,059,361 | 11/1977 | Allison | 403/141 X |

FOREIGN PATENT DOCUMENTS 430424 6/1935 United Kingdom .................. 74/588

Primary Examiner—Rodney M. Lindsey
Attorney, Agent, or Firm—Tarolli, Sundheim & Covell

[57] ABSTRACT

A linkage component includes a rod portion. The rod portion of the linkage component includes a tubular inner layer and a tubular outer layer which is coaxial with and encloses the tubular inner layer. An inner surface of the tubular outer layer circumferentially abuts an outer surface of the tubular inner layer along at least a major portion of the axial extent of the rod portion. The double-layered rod portion of the linkage component has a relatively large section modulus.

11 Claims, 4 Drawing Sheets

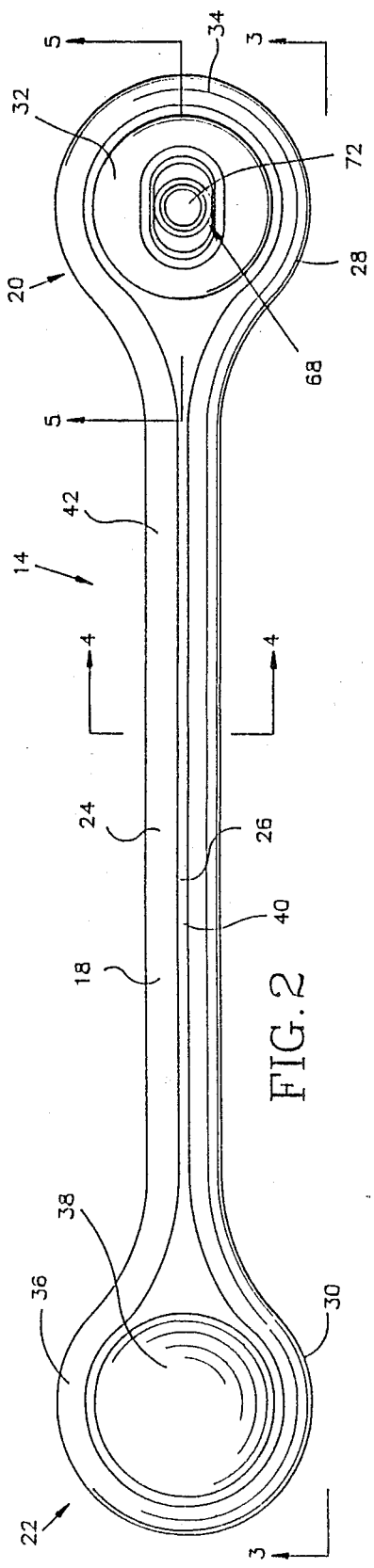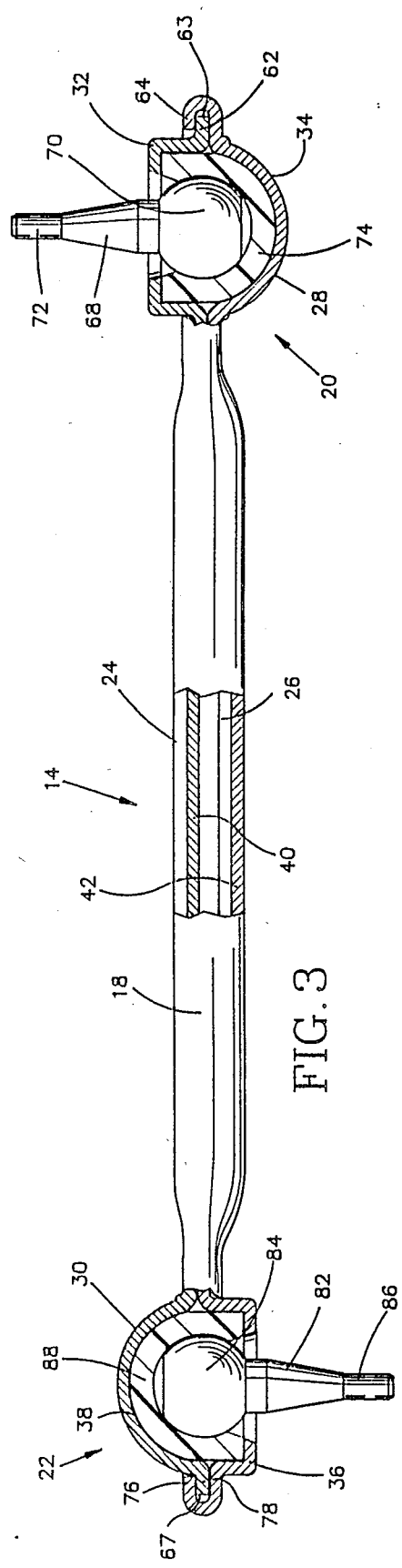

LINKAGE COMPONENT

BACKGROUND OF THE INVENTION

1. Technical Field

The present invention relates to a linkage component for use in a vehicle steering or suspension system, and particularly to a linkage component formed of sheet metal stampings.

2. Background

A connecting link is disclosed in U.S. Pat. No. 1,898,100, issued Feb. 21, 1933 and entitled "Permanent Connecting Unit and Method of Forming the Same". The connecting link is formed from two sheet metal stampings. The two sheet metal stampings form sockets for receiving ball studs and a central portion connecting the sockets. One stamping forms the upper half of the central portion, while the other stamping forms the lower half of the central portion.

The connecting link disclosed in the aforementioned U.S. Pat. No. 1,898,100 has a single-layered central portion. Given the same thickness of material and connecting links of similar construction, a connecting link having a double-layered central portion would be relatively stronger in transverse loading as compared with the connecting link of U.S. Pat. No. 1,898,100 having a single-layered central portion. This is because the central portion of the single-layered connecting link has a lower section modulus than the connecting link having a double-layered central portion. Therefore, the connecting link with a single-layered central portion is not able to withstand transverse forces as great as the connecting link with a double-layered central portion.

SUMMARY OF THE INVENTION

The present invention is directed to a component for use in a vehicle linkage, such as a steering linkage or suspension linkage. The linkage component of the present invention has a joint portion and a rod portion. The joint portion includes a stud and a housing at least partially enclosing the stud. The rod portion is relatively strong and can readily withstand the loads to which a vehicle steering and/or suspension linkage are subjected. The rod portion includes a tubular inner layer and a tubular outer layer which is coaxial with and encloses the tubular inner layer.

The tubular inner layer of the rod portion and one side section of the joint housing are formed from one sheet metal stamping. The tubular outer layer of the rod portion and another side section of the joint housing are formed from another sheet metal stamping. An inner surface of the tubular outer layer circumferentially abuts an outer surface of the tubular inner layer along at least a major portion of the axial extent of the rod portion.

In one embodiment of the present invention, the linkage component is a tie rod assembly having pivot joints at opposite ends of the rod portion. In another embodiment of the present invention, the linkage component is a tie rod end assembly having a pivot joint at only one end of the rod portion.

BRIEF DESCRIPTION OF THE DRAWINGS

The foregoing and other features and advantages of the present invention will become apparent to one skilled in the art to which the present invention relates from reading the following description in conjunction with the accompanying drawings, wherein:

FIG. 2 is a top plan view of the tie rod assembly of the vehicle steering linkage of FIG. 1;

FIG. 3 is a view, taken along the line 3—3 of FIG. 2, and showing some parts in section;

DESCRIPTION OF SPECIFIC EMBODIMENTS OF THE INVENTION

Figure 1:
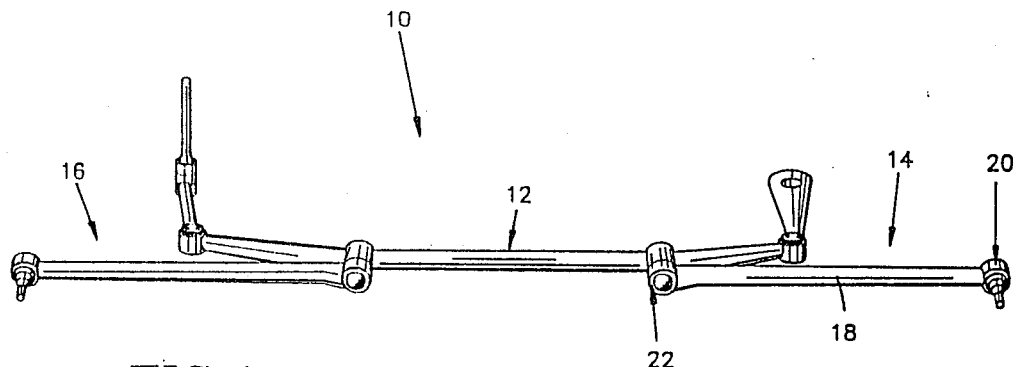
FIG. 1 is a schematic illustration of a vehicle steering linkage having a tie rod assembly constructed in accordance with the present invention.

A vehicle steering linkage 10 for turning steerable wheels of a vehicle is illustrated in FIG. 1. The linkage 10 includes a steering member 12 which is axially movable by rotation of a steering wheel, as is known. The steering member 12 is connected to one of the steerable wheels of the vehicle by a first linkage component or tie rod assembly 14 and to another of the steerable wheels of the vehicle by a second linkage component or tie rod assembly 16.

The first tie rod assembly 14 (FIGS. 2 and 3) includes a rod portion 18 which interconnects a first pivot joint 20 and a second pivot joint 22. Two sheet metal stampings 24 and 26 form a housing 28 for the first pivot joint 20, a housing 30 for the second pivot joint 22, and the interconnecting rod portion 18.

The stamping 24 includes a central portion 42 having sections 34 and 36 at its opposite ends. The stamping 26 includes a central portion 40 having sections 32 and 38 at its opposite ends. The section 32 (FIG. 3) forms one side of the housing 28. The section 34 forms the other side of the housing 28. The section 36 forms one side of the housing 30. The other side of the housing 30 is the section 38.

Figure 4:
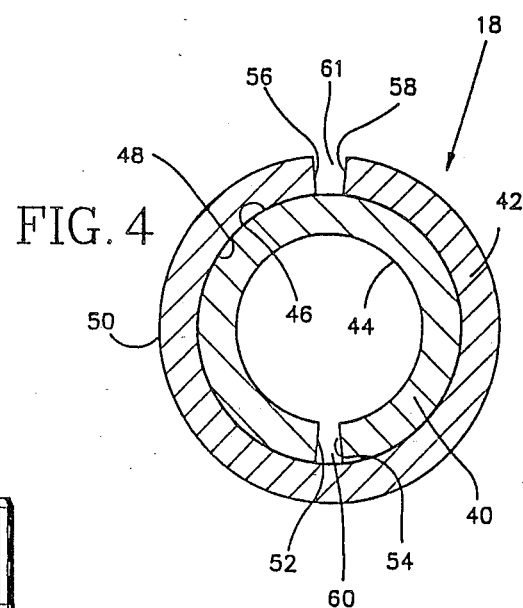
FIG. 4 is an enlarged, sectional view taken along the line 4—4 of FIG. 2, illustrating the construction of a rod portion of the tie rod assembly of FIGS. 2 and 3.

The rod portion 18 includes the central portions 40 and 42. Central portion 40 is a tubular inner layer (FIG. 4) having a cylindrical configuration for at least a major portion of its axial extent. Central portion 42 is a tubular outer layer having a cylindrical configuration for at least a major portion of its axial extent. The tubular outer layer 42 is coaxial with and encloses the tubular inner layer 40. The tubular inner layer 40 includes inner and outer arcuate, major side surfaces 44, 46. The tubular outer layer 42 includes inner and outer arcuate, major side surfaces 48, 50. The inner arcuate, major side surface 48 of the tubular outer layer 42 circumferentially abuts the outer arcuate, major side surface 46 of the tubular inner layer 40 along a major portion of its axial extent. Thus, the double-layered rod portion 18 has a relatively large section modulus. Therefore, the rod portion 18 can withstand relatively large, transverse loads.

The tubular inner layer 40 further includes two flat, minor side surfaces 52, 54. The minor side surfaces 52, 54 of the tubular inner layer 40 are disposed in a side-by-side relationship throughout at least a major portion of the axial extent of the rod portion 18. The tubular outer layer 42 further includes two flat, minor side surfaces 56, 58. The pair of flat, minor side surfaces 56, 58 of the tubular outer layer 42 are disposed in a side-by-side relationship throughout at least a major portion of the axial extent of the rod portion 18. The pair of flat, minor side surfaces 52, 54 of the tubular inner layer 40 are disposed on a side of the rod portion 18 opposite from the pair of flat, minor side surfaces 56, 58 of the tubular outer layer 42.

A longitudinally extending gap 60 is between the pair of minor surfaces 52, 54 of the tubular inner layer 40. A second longitudinally extending gap 61 is between the pair of flat, minor surfaces 56, 58 of the tubular outer layer 42. It is possible to abut the minor side surface 52 with the minor side surface 54 so as to eliminate the gap 60. Similarly, it is possible to abut the minor side surface 56 with the minor side surface 58 so as to eliminate the gap 61. When the two gaps 60, 61 are eliminated, the inner arcuate, major side surface 48 of the tubular outer layer 42 is in continuous, circumferential abutment with the outer arcuate, major side surface 46 of the tubular inner layer 40 along a major portion of its axial extent.

The tubular inner layer 40 (FIG. 3) of the rod portion 18 is formed from a single, continuous, homogeneous piece of material with the side section 32 of the first pivot joint housing 28 and the side section 38 of the second pivot joint housing 30. The tubular outer layer 42 of the rod portion 18 is formed from a single, continuous, homogeneous piece of material with the side section 34 of the first pivot joint housing 28 and the side section 36 of the second pivot joint housing 30.

Figure 5:
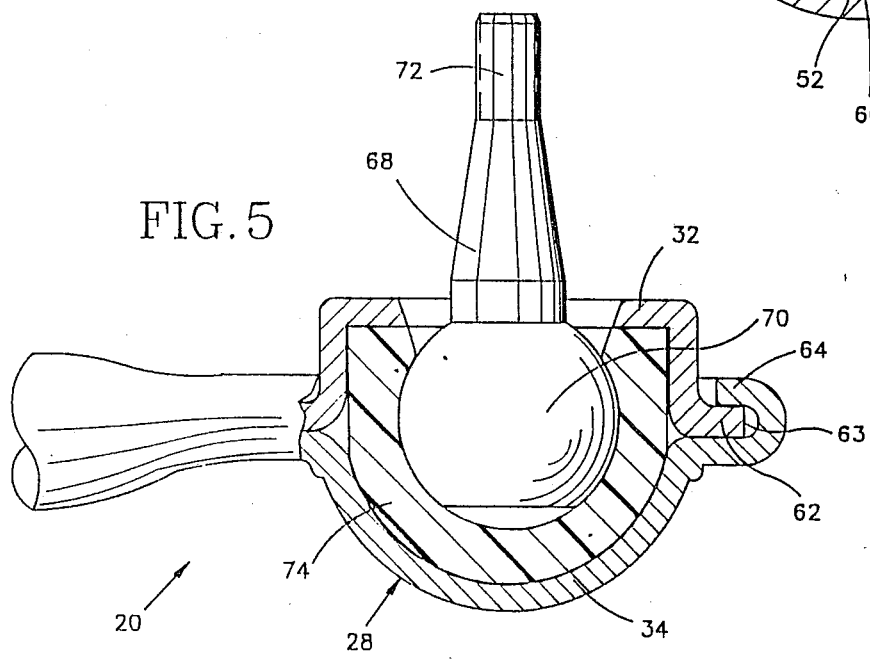
FIG. 5 is an enlarged, sectional view taken along the line 5—5 of FIG. 2, illustrating the construction of a pivot joint at one end of the tie rod assembly of FIGS. 2 and 3.

The pivot joint housing 28 (FIG. 5) of the pivot joint 20 is formed from the side section 32 and the side section 34. The side section 32 has a flange 62 terminating in an outer edge 63. The side section 34 has a flange 64 which is folded over the outer edge 63 and flange 62 of the side section 32. The flange 64 is folded over the flange 62 to hold the two sections 32, 34 together.

The pivot joint housing 28 defines a socket for receiving and pivotally supporting a ball stud 68. The ball stud 68 includes a head end 70 and a shank 72. The head end 70 is at least partially enclosed by the pivot joint housing 28. The head end 70 has an elastomeric bearing 74 bonded thereto. The elastomeric bearing 74 is also bonded or otherwise attached to the housing 28. The bearing 74 resists movement of the ball stud 68 relative to the housing 28 and urges the ball stud 68 and housing 28 to initial relative positions when moved therefrom. The shank 72 extends from the head end 70 through an opening in the side section 32 of the pivot joint housing 28.

The pivot joint housing 30 (FIG. 3) of the pivot joint 22 is formed from the side section 36 and the side section 38. The side section 38 has a flange 78 terminating in an outer edge 67. The side section 36 has the flange 76 which is folded over the outer edge 67 and flange 78 of the side section 38. The flange 76 is folded over the flange 78 to hold the two sections 36, 38 together.

The pivot joint housing 30 defines a socket for receiving and pivotally supporting a ball stud 82. The ball stud 82 includes a head end 84 and a shank 86. The head end 84 is at least partially enclosed by the pivot joint housing 30. The head end 84 has an elastomeric bearing 88 bonded thereto. The elastomeric bearing 88 is also bonded or otherwise attached to the housing 30. The bearing 88 resists movement of the ball stud 82 relative to the housing 30 and urges the ball stud 82 and the housing 30 to initial relative positions when moved therefrom. The shank 86 extends from the head end 84 through an opening in the side section 36 of the pivot joint housing 30.

Figure 6:
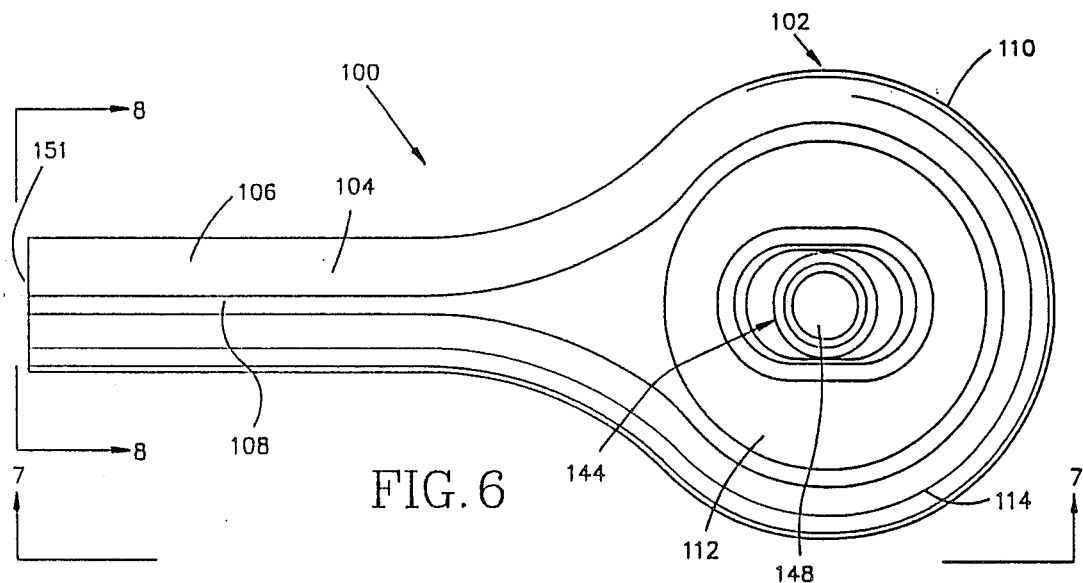
FIG. 6 is a top plan view of a tie rod end assembly forming a second embodiment of the invention.
Figure 7:
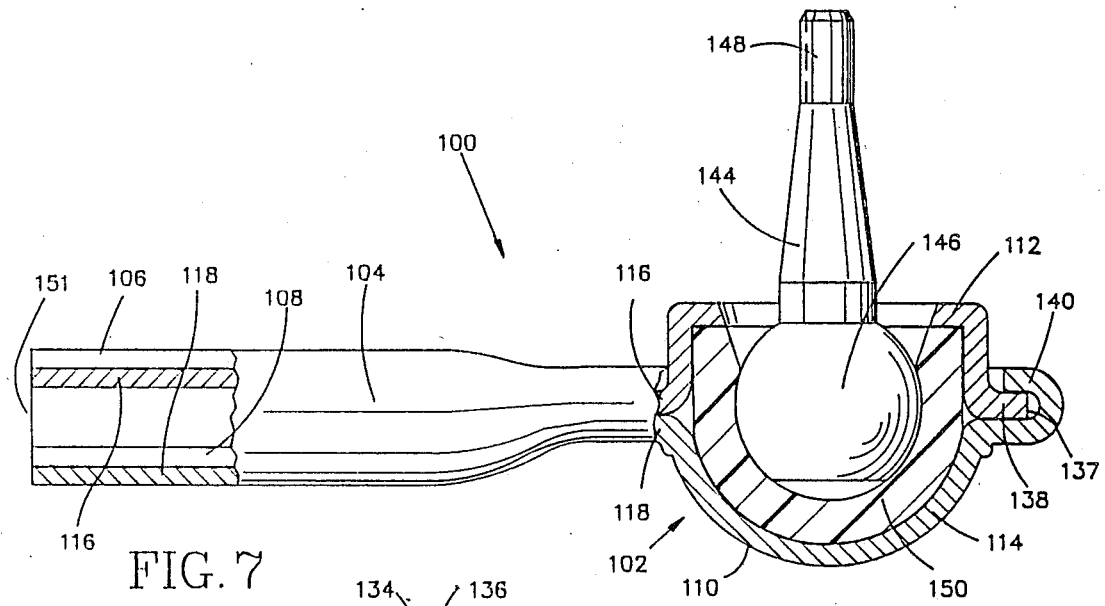
FIG. 7 is a view, taken along the line 7—7 of FIG. 6 and showing portions in section.

A second embodiment (FIGS. 6 and 7) of the present invention comprises a tie rod end assembly 100 which includes a pivot joint 102 and a rod portion 104. Two sheet metal stampings 106, 108 form the rod portion 104 and a pivot joint housing 110 for the pivot joint 102. The stamping 108 includes a section 112 to form one side of the pivot joint housing 110, and the stamping 106 includes a section 114 to form the other side of the pivot joint housing 110.

Figure 8:
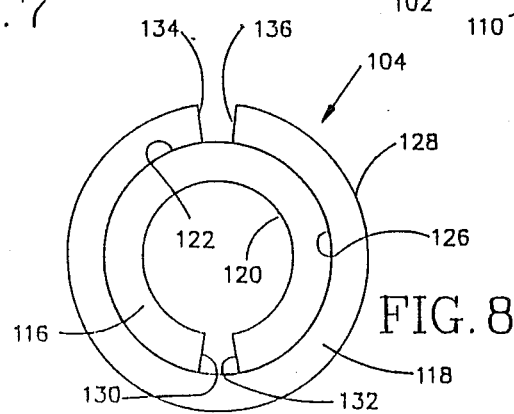
FIG. 8 is an enlarged, end view taken along the line 8—8 of FIG. 6, illustrating the construction of a rod portion of the tie rod end assembly of FIGS. 6 and 7.

The rod portion 104 (FIG. 8) includes stem portions 116 and 118. Stem portion 116 is a tubular inner layer having a cylindrical configuration for at least a major portion of its axial extent. Stem portion 118 is a tubular outer layer having a cylindrical configuration for at least a major portion of its axial extent. The tubular outer layer 118 is coaxial with and encloses the tubular layer 116. The inner surface of the tubular outer layer 118 is in circumferential abutting engagement with the outer surface of the tubular inner layer 116 along a major portion of the axial extent of the rod portion 104.

The tubular inner layer 116 includes two arcuate, major side surfaces 120, 122. One of the arcuate, major side surfaces 120 is an inner surface of the tubular inner layer 116, and the other arcuate, major side surface 122 is an outer surface of the tubular inner layer 116. The tubular outer layer 118 includes two arcuate, major side surfaces 126, 128. One of the arcuate, major side surfaces 126 is an inner surface of the tubular outer layer 118, and the other arcuate, major side surface 128 is an outer surface of the tubular outer layer 118.

The tubular inner layer 116 further includes two flat, minor side surfaces 130, 132. The tubular outer layer 118 further includes two flat, minor side surfaces 134, 136. The relationship between the two flat, minor side surfaces 130, 132, and the relationship between the two flat, minor side surfaces 134, 136 are identical to that described for the tie rod assembly 14 of FIGS. 2 and 3, as described hereinabove. Also, the relationship between the two pairs of flat, minor side surfaces 130, 132, and 134, 136 are identical to that described for the tie rod assembly 14.

The tubular inner layer 116 (FIG. 7) of the rod portion 104 is formed from a single, continuous, homogeneous piece of material with the side section 112 of the pivot joint housing 110. The tubular outer layer 118 of the rod portion 104 is formed from a single, continuous, homogeneous piece of material with the side section 114 of the pivot joint housing 110.

The pivot joint housing 110 of the pivot joint 102 is formed from the side section 112 and the side section 114. The side section 112 has a flange 138 terminating in an outer edge 137. The side section 114 has a flange 140 which is folded over the outer edge 137 and flange 138 of the side section 112. The flange 140 is folded over the flange 138 to hold the two sections 112, 114 together.

The pivot joint 102 includes the pivot joint housing 110. The pivot joint housing 110 defines a socket for receiving and pivotally supporting a ball stud 144. The ball stud 144 includes a head end 146 and a shank 148. The head end 146 is at least partially enclosed by the pivot joint housing 110. The head end 146 has an elastomeric bearing 150 bonded thereto. The elastomeric bearing 150 is also bonded or otherwise attached to the housing 110. The bearing 150 resists movement of the ball stud 144 relative to the housing 110 and urges the ball stud 144 and the housing 110 to initial relative positions when moved therefrom. The shank 148 extends from the head end 146 through an opening in the side section 112 of the housing 110.

Figure 9:
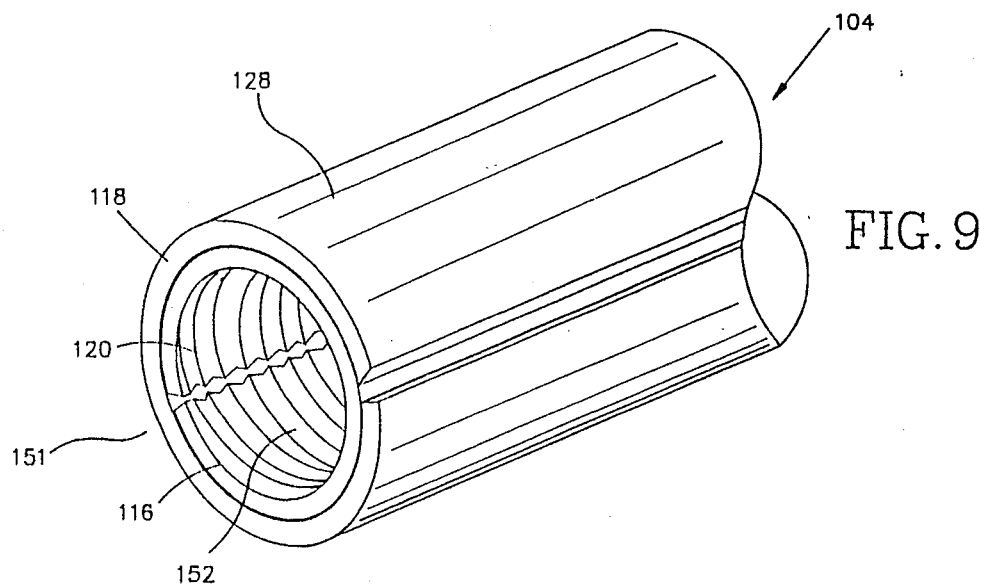
FIG. 9 is an enlarged, perspective view, illustrating an end of the rod portion of the tie rod end assembly of FIGS. 6 and 7 in which the end of the rod portion has a threaded interior surface.

An end 151 of the rod portion 104 of the tie rod end assembly 100 has a threaded interior surface. The end 151 (FIG. 9) includes a portion of the rod portion 104. The inner surface 120 of the tubular inner layer 116 has threads 152 disposed at least throughout a portion of the rod portion 104. The threaded portion of the tubular inner layer 116 of the rod portion 104 is connectable to a solid linkage component such as a tie rod, not shown. The solid linkage component requires an outer surface which is at least partially threaded so as to be connectable to the rod portion 104.

Figure 10:
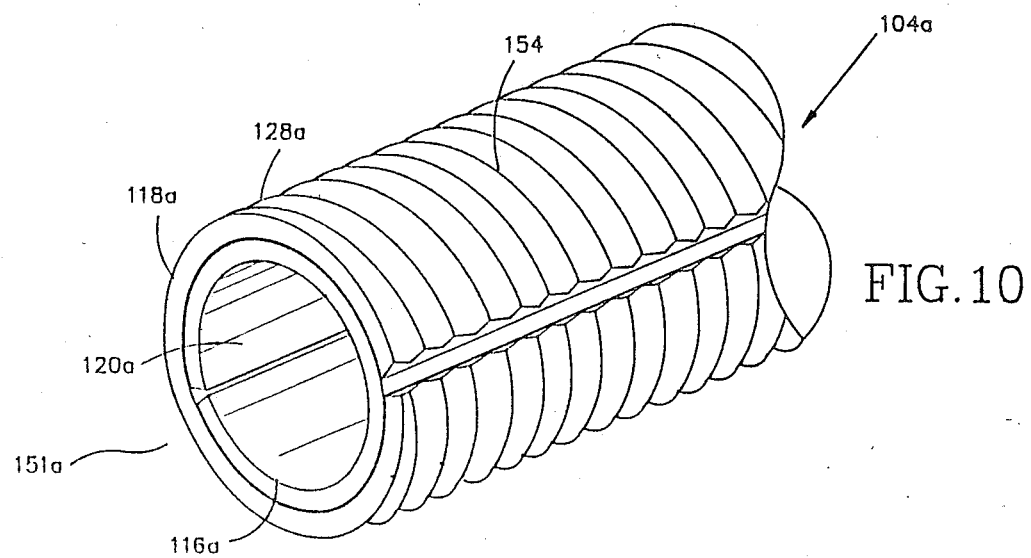
FIG. 10 illustrates a portion of a third embodiment of the invention in which an end of a rod portion of a tie rod end assembly has a threaded exterior surface.

It is also contemplated that it may be preferred to have a threaded exterior surface at the end of the rod portion of the tie rod end assembly. A portion of such a tie rod end assembly is disclosed in FIG. 10. Since the portion of the embodiment illustrated in FIG. 10 is generally similar to the portion of the embodiment illustrated in FIG. 9, similar numerals are utilized to designate similar components, the suffix letter "a" being added to the numerals associated with the embodiment of FIG. 10. The end 151a includes a portion of the rod portion 104a. The outer surface 128a of the tubular outer layer 118a has threads 154 disposed at least throughout a portion of the rod portion 104a. The threaded portion of the tubular outer layer 118a of the rod portion 104a is connectable to a hollow linkage component, not shown. The hollow linkage component requires an inner surface which is at least partially threaded so as to be connectable to the rod portion 104a.

This invention has been described above with reference to preferred embodiments. Modifications and alterations may become apparent to one skilled in the art upon reading and understanding this specification. It is intended to include all such modifications and alterations within the scope of the appended claims.

Having described specific preferred embodiments of the invention, the following is claimed:

1. A component for use in a vehicle linkage, said component comprising:
   a joint portion, said joint portion including a housing and a stud which is at least partially enclosed by said housing, means in said housing for supporting said stud for pivotal movement relative to said housing, said housing including a first side section and a second side section which is connected to said first side section, said first and second side sections having flange portions one of which is folded over the other to interconnect said first and second side sections, said stud extending through an opening in one of said side sections; and
   a rod portion having a double-layered wall over a major portion of its circumferential extent and including a tubular inner layer and a tubular outer layer which is coaxial with said tubular inner layer, said tubular outer layer defining a substantially closed chamber therein and enclosing said tubular inner layer in said chamber, said tubular outer layer of said rod portion and said first side section of said housing comprising one piece, and said tubular inner layer of said rod portion and said second side section of said housing comprising one piece.

2. A component as set forth in claim 1 further including a second joint portion, said second joint portion including a second housing and a second stud, means in said second housing for supporting said second stud for pivotal movement relative to said second housing, said second housing including a third side section and a fourth side section which is connected with said third side section, said third and fourth side sections having flange portions one of which is folded over the other to interconnect said third and fourth side sections, said tubular inner layer of said rod portion being formed as one piece with said fourth side section of said second housing and said tubular outer layer of said rod portion being formed as one piece with said third side section of said second housing, said second stud extending through an opening in one of said side sections of said second housing.

3. A component as set forth in claim 2 wherein said second stud includes a second head end and a second shank extending from said second head end through said opening in one of said side sections of said second housing.

4. A component as set forth in claim 1 wherein said tubular inner layer has a cylindrical inner side surface area which is at least partially threaded.

5. A component as set forth in claim 1 wherein said tubular outer layer has a cylindrical outer side surface area which is at least partially threaded.

6. A component as set forth in claim 1 wherein said tubular inner layer includes an outer side surface and said tubular outer layer includes an inner side surface, said outer side surface of said tubular inner layer being disposed in abutting engagement with said inner side surface of said tubular outer layer for at least a major portion of the axial extent of said rod portion.

7. A component as set forth in claim 1 wherein said tubular inner layer has a cylindrical configuration throughout at least a major portion of the axial extent of said rod portion and said outer layer has a cylindrical configuration throughout at least a major portion of the axial extent of said rod portion.

8. A component as set forth in claim 1 wherein said tubular inner layer has arcuate, major side surfaces and a pair of flat, minor side surfaces which are disposed in a side-by-side relationship throughout at least a major portion of the axial extent of said rod portion, said tubular outer layer having arcuate, major side surfaces and a pair of flat, minor side surfaces which are disposed in a side-by-side relationship throughout at least a major portion of the axial extent of said rod portion and are disposed on a side of said rod portion opposite from said minor side surfaces of said tubular inner layer.

9. A component as set forth in claim 8 wherein one of said arcuate, major side surfaces of said tubular inner layer is disposed in abutting engagement with one of said arcuate, major side surfaces of said tubular outer layer from said minor side surfaces of said tubular inner layer to said minor side surfaces of said outer layer.

10. A component as set forth in claim 1 wherein said tubular inner and outer layers are cylindrical throughout at least a major portion of the axial extent of said rod portion, at least a major portion of said tubular inner layer being enclosed by said tubular outer layer throughout at least a major portion of the axial extent of said rod portion.

11. A component for use in a vehicle linkage, said component comprising:

a first pivot joint, said first pivot joint including a first housing, said first housing including a first side section and a second side section which is connected with said first side section, said first and second side sections having flange portions one of which is folded over the other to interconnect said first and second side sections, said first pivot joint further including a first stud which is at least partially enclosed by said first housing and means in said first housing for supporting said first stud for pivotal movement relative to said first housing, said first stud including a head end and a shank extending from said head end through said first side section of said first housing;

a second pivot joint, said second pivot joint including a second housing, said second housing including a third side section and a fourth side section which is connected with said third side section, said third and fourth side sections having flange portions one of which is folded over the other to interconnect said third and fourth side sections, said second pivot joint further including a second stud which is at least partially enclosed by said second housing and means in said second housing for supporting said second stud for pivotal movement relative to said second housing, said second stud including a head end and a shank extending from said head end through said third side section of said second housing; and a rod portion having a double-layered wall over a major portion of its circumferential extent and including a tubular inner layer and a tubular outer layer which is coaxial with and encloses at least a major portion of said tubular inner layer throughout at least a major portion of the axial extent of said rod portion, said tubular outer layer defining a substantially closed chamber therein and enclosing said tubular inner layer in said chamber, said tubular inner layer of said rod portion being formed as one piece with a first one of said first and second side sections of said first housing and with a first one of said third and fourth side sections of said second housing, said tubular outer layer of said rod portion being formed as one piece with a second one of said first and second side sections of said first housing and with a second one of said third and fourth side sections of said second housing.

* * * * *